United States Patent [19]
Chang et al.

[11] 4,353,971
[45] Oct. 12, 1982

[54] SQUARYLIUM DYE AND DIANE BLUE DYE CHARGE GENERATING LAYER MIXTURE FOR ELECTROPHOTOGRAPHIC LIGHT SENSITIVE ELEMENTS AND PROCESSES

[75] Inventors: Mike S. H. Chang, Danbury; Peter G. Edelman, Westport, both of Conn.

[73] Assignee: Pitney Bowes Inc., Stamford, Conn.

[21] Appl. No.: 214,320

[22] Filed: Dec. 8, 1980

[51] Int. Cl.$^3$ .......................... G03G 5/06; G03G 5/09
[52] U.S. Cl. ..................................... 430/58; 252/500; 252/559; 430/78; 430/56
[58] Field of Search ..................... 430/58, 59; 282/500

[56] References Cited
FOREIGN PATENT DOCUMENTS
2032637  5/1980  United Kingdom ................. 430/59

Primary Examiner—John D. Welsh
Attorney, Agent, or Firm—Melvin J. Scolnick; William D. Soltow, Jr.; Albert W. Scribner

[57] ABSTRACT

Dual layer organic photoconductive elements which are stable and sensitive over a broad range of the spectrum, including near the infrared band, and the process for preparing same. The charge-generating layer comprises a mixture of a charge-generating dye, such as a diane blue dye, and a squarylium dye as a near-infrared sensitizer.

12 Claims, No Drawings

1

SQUARYLIUM DYE AND DIANE BLUE DYE CHARGE GENERATING LAYER MIXTURE FOR ELECTROPHOTOGRAPHIC LIGHT SENSITIVE ELEMENTS AND PROCESSES

BACKGROUND OF THE INVENTION

The present invention relates to the field of electrophotographic reproduction and, more particularly, to dual layer organic photoconductive elements such as belts, drums, webs, or the like, which are used in machines such as copying machines. U.S. Pat. Nos. 3,615,415, 3,824,099 and 4,150,987 have a discussion of the general field of the present invention and disclosures of some of the specific materials and procedures over which the present invention represents an improvement.

Aforementioned U.S. Pat. Nos. 3,824,099 and 4,150,987 relate to dual layer organic photoconductive elements comprising a conductive substrate such as a conductive paper, metallized plastic film or metal plate, supporting two basic layers, namely a charge-generating layer and a charge-transport layer. Either layer may be adjacent the conductive substrate, and an adhesive bonding layer may be interposed to bond the charge-generating layer.

During use, the photoconductive element is charged, exposed to light passed from the light-reflective areas of an imaged original sheet to conduct away the charge in the exposed areas, and the charge-retaining or unexposed areas are either "inked" with electroscopic toner which is transferred to a copy sheet or are first transferred to a copy sheet and then "linked" with toner thereon. The toner is fused on the copy sheet to form fixed images corresponding to the images present on the original sheet.

Dual layer organic photoconductive elements were developed in order to provide extremely fast response to light exposure within the visible range of the spectrum. Preferred materials in this respect are diane blue dyes as the charge-generating organic chemicals of the charge-generating layer and p-type hydrazones or triaryl pyrazolines as the organic chemicals in the charge-transport layer.

Diane blue dyes have the general moiety structure as follows:

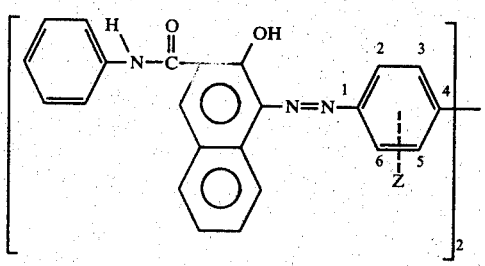

wherein Z is a substitutent group on the phenyl ring. Preferably, Z is selected from a group consisting essentially of hydrogen, alkyl, alkoxy and chlorine groups, more preferably hydrogen, methyl, methoxy and chlorine groups; and most preferably a chlorine group. Z is preferably attached to the ring in the 2 or 6 position. The most preferred diane blue, Chlorodiane Blue, has chlorine as the Z group in the 2 position.

Chlorodiane Blue is a preferred charge-generating material because it has good stability and provides photoconductive elements having a desired shelf life or duration of storage prior to breakdown and deterioration or loss of its charge-generating properties. Chlorodiane Blue also has superior light sensitivity and charge-generating properties over a broad portion of the visible light range, i.e., between about 400 mμ and 700 mμ. However, Chlorodiane Blue lacks adequate light sensitivity in the near-infrared range, i.e., between about 780 mμ and 1150 mμ.

Squarylium dyes are described in U.S. Pat. No. 3,824,099 as providing charge-generating layers which are panchromatic out to about 7000 Angstrom units and which are responsive to light having wave lengths up to 9000 Angstrom units. However, we have found that photoconductive elements prepared according to U.S. Pat. No. 3,824,099, and containing squarylium dye as disclosed in said Patent as the charge-generating material, have an insignificant amount of negative charge acceptance, and therefore are substantially useless as photoconductive elements for duplication purposes. However, we discovered that by combining a certain amount of the squarylium dye with a diane blue dye, such as Chlorodiane Blue, charge-generating layers can be produced which have the desired negative charge acceptance and which are also sensitive to near-infrared radiation.

SUMMARY OF THE INVENTION

The novel dual-layer organic photoconductive elements of the present invention were developed in order to provide improved sensitive photoconductive elements having an extremely fast response to light exposure within a wide range of the spectrum including not only the visible spectrum but also extending into and including the near-infrared range, i.e., within a broad range of from about 400 mμ up to about 1150 mμ.

The present invention is based upon the discovery that while charge-generating layers containing Chlordiane Blue are only highly sensitive to light exposure within the visible range; i.e., between 400 mμ and 700 mμ and thus are unsuitable for use with certain lasers as a light exposure source, and charge-generating layers based upon squarylium dye(s) lack the desired stability and/or high sensitivity of charge-generating layers based upon a diane blue such as Chlorodiane blue, unexpectedly the combination of certain amounts of these charge-generating organic chemicals within the same charge-generating layer results in a layer which has the stability and excellent sensitivity to light possessed by a diane blue, such as Chlorodiane Blue, but extending into and including a range of the near-infrared, i.e., within a range of between about 400 mμ and about 1150 mμ, and thus is suitable for use with visible light sources as well as certain near-infrared light sources, such as certain lasers especially within a spectrum range of about 800 to about 850 mμ, as the light exposure source.

The novel combination of charge-generating organic chemicals comprises at least one diane blue and at least one squarylium dye (or squaric acid methine dye). Preferred squarylium dyes are selected from the group:

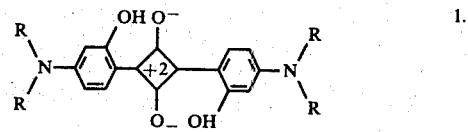

1.

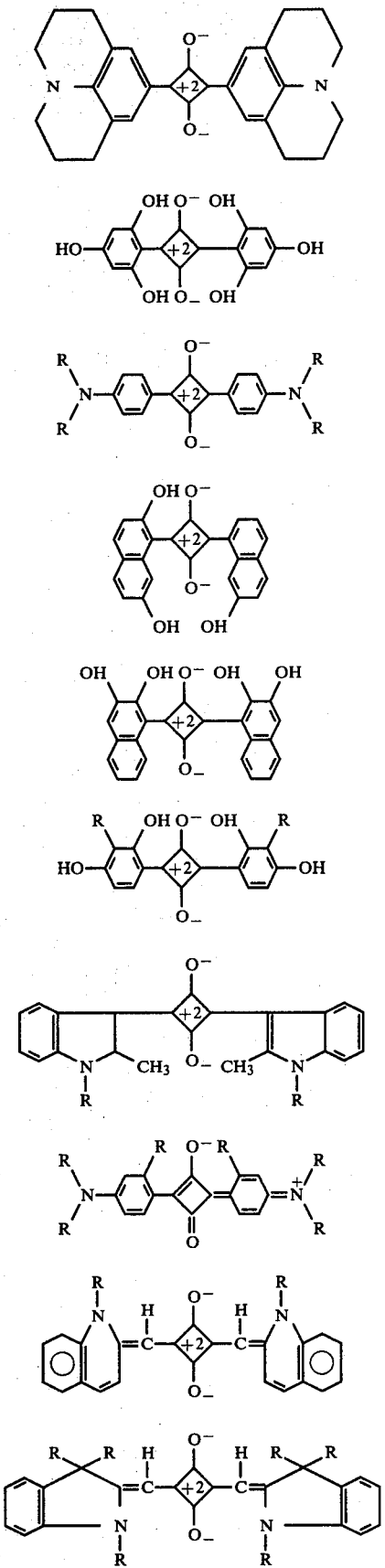

wherein the radical "R" is a methyl or ethyl group. Other known charge-generating squarylium dyes may also be used in place of the preferred dyes listed above.

Generally, the effective weight percent of the squarylium dye sensitizer relative to the total weight of the charge-generating materials of the mixture can range between about 0.05% and 50.0%. Preferably, the diane blue dye is the major ingredient of the mixture and the squarylium dye comprises from about 1% to about 10% by weight of the mixture, most preferably from about 1% to about 5% by weight of the mixture to produce the desired stability and high degree of sensitivity within a broad range of the spectrum including near infrared radiation.

The charge-generating layers of the present invention may be formulated and coated in any manner conventional in the art of dual layer organic photoconductive elements, such as taught for instances by U.S. Pat. Nos. 4,150,987 and 3,824,099. For example, the dye mixture may be dispersed and ground in a suitable volatile vehicle such as tetrahydrofuran, preferably at a concentration of 1.0% to 3.0%. The squarylium dye may be dissolved or dispersed in the vehicle.

A preferred embodiment involves the application of the charge-generating layer over an adhesive bonding layer present on a conductive support, which support may be a conventional aluminized polyethylene terephthalate film available under the registered trademark Mylar. A preferred adhesive bonding layer comprises a continuous coating of one or more adhesive resins known in the art, such as available from Goodyear under the registered trademark Vitel PE200 and PE307. Suitable conductive supports and bonding layers are disclosed in aforementioned U.S. Pat. No. 4,150,987.

Alternatively, if desired, the present mixture of charge-generating dyes can be mixed with a desired adhesive resin in a proper ratio, followed by coating onto the conductive surface of the substrate. Optionally, the substrate can also have an adhesive layer precoated on its conductive surface before the dye layer coating, as discussed above.

As disclosed supra, the charge-transport layers suitable for use with the novel charge-generating layers of the present invention, and the method for preparing and applying the same in association with the present charge-generating layers, are conventional in the art and the pertinent disclosures of U.S. Pat. Nos. 3,615,415, 3,824,099 and 4,150,987 are incorporated herein by reference. The preferred charge-transport organic chemicals are the triaryl pyrazoline compounds of U.S. Pat. No. 3,824,099, such as 1-phenyl-3-[p-diethylaminostyryl]-5-[p-diethylamino phenyl]-pyrazoline, and the hydrazone compounds of U.S. Pat. No. 4,150,987, such as p-diethylaminobenzaldehyde-(diphenyl hydrazone). The charge-transfer chemical is dispersed or dissolved in a solution of one or more resinous binder materials and the charge-transport layer is applied and dried by evaporation of the volatile solvent, in known manner.

The following example is given to illustrate the present invention but is not to be considered as a limitation of the scope of the invention.

EXAMPLE 1

The general procedure disclosed in Example 1 of U.S. Pat. No. 4,150,987 was followed to prepare an organic photoconductive element according to the present invention except that the charge-generating layer was formulated and coated in the following manner.

The charge-generating coating composition was produced by mixing together 5.0 mg. of hydroxy squarylium (Formula 1 supra) and 0.267 g. of Chlorodiane Blue and adding to the mixture 15 ml. of tetrahydrofuran as a volatile vehicle to form a dispersion. The dispersion was ball milled for eight hours in a 2 ounce jar using ⅛" chrome-plated balls until the maximum particle size of the dye particles is 0.25 mil or less, as measured with a fineness of Grind Measurer of the Precision Gauge and Tool Co.

The conductive substrate of aluminized Mylar is first coated with an adhesive bonding layer comprising a mixture of equal parts by weight of Vitel PE-00 and Vitel PE-307, the bonding layer haing a weight of about 13 mg/ft² over th aluminized surface of the Mylar substrate.

The ground dye mixture dispersion is applied over the adhesive bonding layer using a Gardner-Ultra Applicator draw down blade with the blade set at a gap of 10, i.e., 1 mil. the dye coating was dried by evaporation of the vehicle to form the charge-generating layer.

Thereafter, a hydrazone charge-transfer layer was formulated and applied over the dye layer in the manner disclosed in Example 1 of U.S. Pat. No. 4,150,987 in a coat weight of about 1.8 g/ft².

The organic photoconductive element of Example 1 supra was compared with the photoconductive element product in exact accordance with Example 1 of U.S. Pat. No. 4,150,987 with respect to photosensitivity to light in the near-infrared region of the spectrum using a Victoreen Electrostatic Paper Analyzer with a Kodak #87 filter positioned between the tungsten lamp and the sample.

The amount of energy required to discharge the charge acceptance from −400 volts to −200 volts, i.e., $E_{\frac{1}{2}}$, was measured in identical fashion for each of the samples. The amount of energy required by the sample produced according to Example 1 herein was determined to be about 132 μJ/cm², whereas the amount of energy required by the sample produced according to Example 1 of U.S. Pat. No. 4,150,987 was determined to be about 7,100 μJ/cm², i.e., over 50 times less sensitivity to the near-infrared radiation transmitted by the Kodak #87 filter.

Variations and modifications of the present invention will be apparent to those skilled in the art within the scope of the present claims.

We claim:
1. A photoconductive element which is extremely sensitive to exposure to light rays in the near-infrared region of the spectrum, said element comprising an electroconductive support, a charge-generating layer comprising a mixture of at least one squarylium dye and at least one diane blue dye in which the weight percent of squarylium dye relating to the total weight of said dye mixture ranges between about 0.05% and 50.0%, said squarylium dye being selected from the group consisting of:

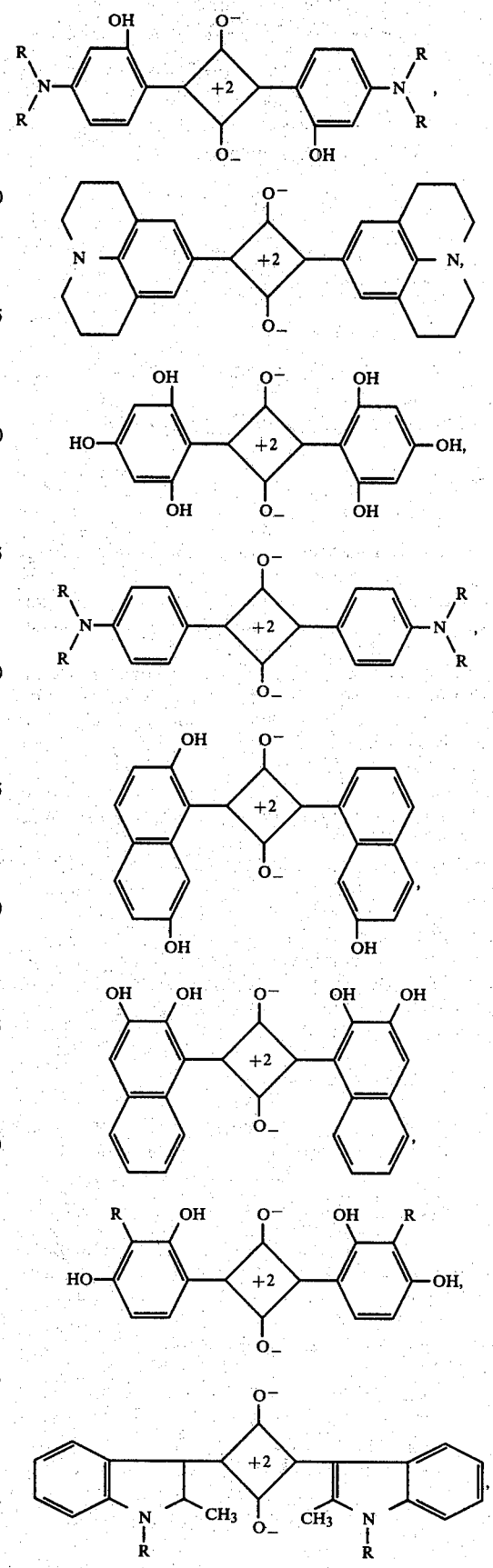

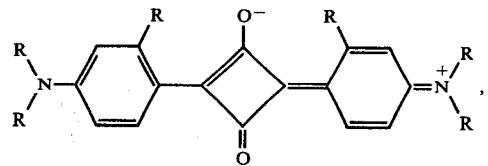

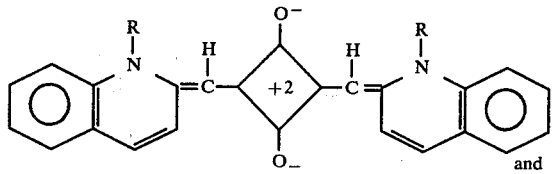

and

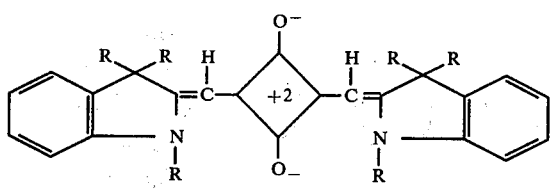

in which R is a methyl or ethyl radical, and a charge transport layer comprising a conventional organic chemical capable of transporting electrical charges generated by said charge generating layer in areas of said element exposed to said light rays.

2. A photoconductive element according to claim 1 in which said diane blue dye comprises Chlorodiane Blue.

3. A photoconductive element according to claim 2 in which said weight percent of squarylium dye ranges between about 1% and 5% of said dye mixture.

4. A photoconductive element according to claim 1 in which said electroconductive support comprises a metallized plastic film.

5. A photoconductive element according to claim 1 in which said electroconductive support carries an adhesive resinous layer which bonds said charge-generating layer to said electroconductive support.

6. A photoconductive element according to claim 1 in which said organic chemical of the charge-transport layer is selected from the group consisting of triaryl pyrazolines and hydrazones.

7. Process for producing a photoconductive element which is extremely sensitive to light rays in the near-infrared region of the spectrum, said element comprising an electroconductive support, a charge-generating layer and a charge transport layer comprising a conventional organic chemical capable of transporting electrical charges conducted by said charge generating layer in areas of said element exposed to said light rays, comprising the step of producing said charge generating layer by mixing together a squarylium dye and a diane blue dye in a coating composition in which the weight percent of squarylium dye relative to the total weight of said dye mixture ranges between about 0.05% and 50.0%, said squarylium dye being selected from the group consisting of:

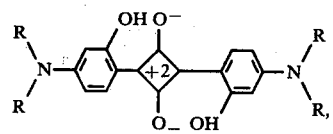

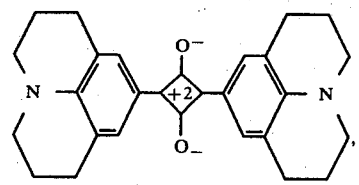

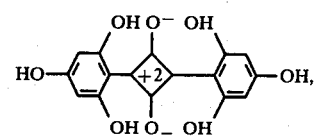

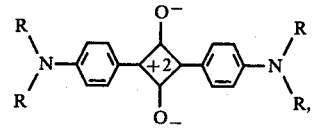

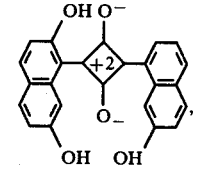

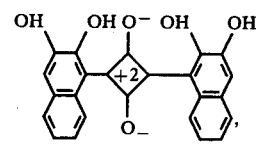

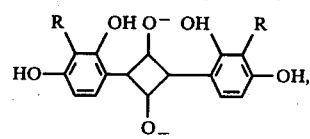

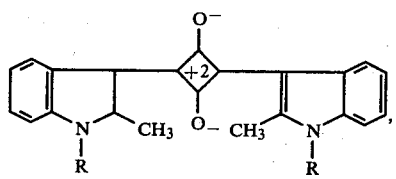

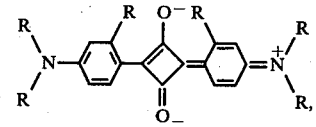

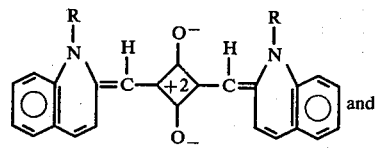

and

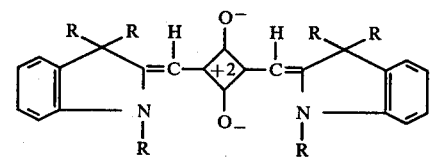

and applying said composition as a uniform thin layer.

8. Process according to claim 7 in which said diane blue dye comprises Chlorodiane Blue.

9. Process according to claim 7 in which said weight percent of squarylium dye ranges between about 1% and 5% of said dye mixture.

10. Process according to claim 7 in which said coating composition comprises from about 1.0% to about 3.0% by weight of said dye mixture in a volatile vehicle which is evaporated to form said charge-generating layer.

11. Process according to claim 7 in which said dye mixture and volatile vehicle are ground to form a coating composition comprising a dispersion of dye particles having a maximum particle size of about 0.25 mil.

12. Process according to claim 7 which comprises coating said electroconductive support with a continuous bonding layer of adhesive resin and applying said charge-generating layer to the surface of said bonding layer.

* * * * *